(12) United States Patent
Sheberla et al.

(10) Patent No.: US 12,486,447 B2
(45) Date of Patent: Dec. 2, 2025

(54) SYSTEMS AND METHODS FOR ELECTROCHROMIC MOLECULES

(71) Applicant: Wuxi Bozhi Huachuang Science and Technology Co., Ltd., Wuxi (CN)

(72) Inventors: Dennis Sheberla, Bedford, MA (US); Selma Duhovic, Denver, CO (US); Sreeletha Joby Eldo, Andover, MA (US); Nathan Darrell Peterson Ricke, Medford, MA (US); Nicolas Yvan Masse, Cambridge, MA (US); Semion Saykin, Arlington, MA (US); Tanja Dimitrov, Brooklyn, NY (US)

(73) Assignee: Wuxi Bozhi Huachuang Science and Technology Co., Ltd., Wuxi (CN)

( * ) Notice: Subject to any disclaimer, the term of this patent is extended or adjusted under 35 U.S.C. 154(b) by 897 days.

(21) Appl. No.: 17/724,782

(22) Filed: Apr. 20, 2022

(65) Prior Publication Data

US 2022/0348821 A1    Nov. 3, 2022

Related U.S. Application Data

(60) Provisional application No. 63/177,798, filed on Apr. 21, 2021.

(51) Int. Cl.
*C09K 9/02*        (2006.01)
*C07D 311/04*    (2006.01)
(Continued)

(52) U.S. Cl.
CPC .............. *C09K 9/02* (2013.01); *C07D 311/04* (2013.01); *C07D 311/30* (2013.01);
(Continued)

(58) Field of Classification Search
CPC .............. C09K 9/02; C09K 2211/1018; C09K 2211/1022; C09K 2211/1088;
(Continued)

(56) References Cited

U.S. PATENT DOCUMENTS 6,020,987 A * 2/2000 Baumann ................. C09K 9/02
                                                          359/273
9,051,397 B2 * 6/2015 Nishimae ................ G03F 7/031
(Continued)

FOREIGN PATENT DOCUMENTS

CN      109331061 A          2/2019
JP      2005220047 A *       8/2005
(Continued)

OTHER PUBLICATIONS

Dorwald ("Side reactions in organic synthesis", 2005, Front Matter & pp. 1-16) (Year: 2005).*
(Continued)

*Primary Examiner* — Matthew R Diaz
(74) *Attorney, Agent, or Firm* — Wolf, Greenfield & Sacks, P.C.

(57) ABSTRACT

The present disclosure generally relates to optoelectronic compounds, including certain 1,2-diketones, for example, 2,3,5,6-tetrafluoro-4-[2-oxo-2-(4-oxo-3-chromenyl)acetyl] benzonitrile. In certain embodiments, these compounds can be used as electrochromic media in devices requiring change of optical absorbance or transmittance as a function of applied voltage. Examples of such devices include electrochromic mirrors, windows, displays, or the like. One specific example is solar and thermal control by smart, dynamic windows for energy-efficient buildings. Other embodiments of the disclosure are generally directed to systems and devices using such compounds, methods of using such
(Continued)

compounds, e.g., to control the absorbance or transmittance of light, kits involving such compounds, or the like.

9 Claims, 5 Drawing Sheets (51) Int. Cl.
*C07D 311/30* (2006.01)
*G02F 1/1516* (2019.01)
*G02F 1/155* (2006.01)

(52) U.S. Cl.
CPC .......... *G02F 1/1516* (2019.01); *G02F 1/155* (2013.01); *C09K 2211/1018* (2013.01); *G02F 2203/01* (2013.01)

(58) Field of Classification Search
CPC ...... G02F 1/1514; G02F 1/1516; G02F 1/155; G02F 2001/1555; G02F 2203/01; C07D 311/04; C07D 311/22; C07D 311/24; C07D 311/26; C07D 311/28; C07D 311/30; C07D 311/34; C07D 311/36; C07D 311/42; C07D 311/52
See application file for complete search history.

(56) References Cited

U.S. PATENT DOCUMENTS

| | | | |
|---|---|---|---|
| 9,711,571 B2 * | 7/2017 | Kwon | G02F 1/155 |
| 10,364,223 B2 * | 7/2019 | Tamura | C07C 317/04 |
| 2021/0032403 A1 * | 2/2021 | Daigle | C08G 65/4087 |

FOREIGN PATENT DOCUMENTS

| | | | | |
|---|---|---|---|---|
| JP | 2007197370 A | * | 8/2007 | |
| JP | 2010077101 A | * | 4/2010 | |
| JP | 2010204438 A | * | 9/2010 | |
| WO | WO-2009098928 A1 | * | 8/2009 | C09K 9/02 |

OTHER PUBLICATIONS

Wadkins et al. ("Identification and characterization of novel benzil (diphenylethane-1,2-dione) analogues as inhibitors of mammalian carboxylesterases", J. Med. Chem., 2005, 48, 2906-2915) (Year: 2005).*

[No Author Listed], diepoxy-tetrahydro-2-(2-phenylethyl) chromone, PubChem, 8 pages.

* cited by examiner

SYSTEMS AND METHODS FOR ELECTROCHROMIC MOLECULES

RELATED APPLICATIONS

This application claims the benefit of U.S. Provisional Patent Application Ser. No. 63/177,798, filed Apr. 21, 2021, entitled "Systems and Methods for Electrochromic Molecules," incorporated herein by reference.

FIELD

The present disclosure generally relates to optoelectronic compounds, including certain 1,2-diketones.

BACKGROUND

Electrochromic materials are materials where the color or opacity of the material changes as a function of the voltage applied to it. For example, when a voltage is applied, an electrochromic material may change its transmittance to light, e.g., to visible, ultraviolet, or infrared light. Such materials may be used in a variety of applications. However, as many electrochromic materials exhibit only certain ranges of changes in variable transmittance, there remains a need for new types of electrochromic materials for various applications.

SUMMARY

The present disclosure generally relates to optoelectronic compounds, including 1,2-diketones. The subject matter of the present disclosure involves, in some cases, interrelated products, alternative solutions to a particular problem, and/or a plurality of different uses of one or more systems and/or articles.

In one aspect, the present disclosure is generally directed to an electrochromic device. In accordance with one set of embodiments, the electrochromic device comprises an electrochromic region comprising a 1,2-diketone compound; and a voltage source able to apply voltage to the electrochromic region.

The electrochromic device, in another set of embodiments, comprises a working electrode; a counter electrode; an electrochromic region comprising a 1,2-diketone, positioned adjacent to the working electrode; and an electrolyte comprising an organic salt and a solvent, positioned adjacent to the electrochromic region.

In yet another set of embodiments, the electrochromic device comprises a working electrode, a counter electrode, a voltage source electrically connecting the working electrode and the counter electrode, an electrochromic region comprising a 1,2-diketone, and an electrolyte comprising an organic salt and a solvent. The electrolyte, in some cases, may be positioned to cause ions from the organic salt to enter the electrochromic region when a voltage is applied by the voltage source.

In another aspect, the present disclosure is generally directed to a method. According to certain embodiments, the method comprises applying voltage to an electrochromic material comprising a 1,2-diketone to cause the electrochromic material to exhibit a change in light transmittance.

In addition, in some embodiments, the method comprises applying voltage to an electrochromic material comprising a compound selected from FIGS. 2-5 to cause the electrochromic material to exhibit a change in light transmittance. In some embodiments, the method comprises applying voltage to an electrochromic material comprising a compound selected from the following compounds, each identified by a first hash block of an InChIKey representation of the compound: YIUNZXJUVIYWLY, IWZBDCZQSPYOAC, AYPXQZLNVLDXPA, OBMXDIQLECDWET, KGZQSIRNJDJSEH, VPLJSKRVTQIUAX, XHNXSWOIEDSWRG, KKHFSNLNDSPNEY, WWPTWXGTOMDZOP, CQAOWYYRAFZAIL, FYPLERMMZIJDTF, IPHYUBYRYRJDDC, DPRGUKRGUQONDT, PEQUWNGOLLDGLK, KHXYHMRDROEKSK, KMXMRHQTEDUUMD, XWDHGFWXYZPHOZ, NFFSPXXVGVOJMR, OPBVQNQRXUIJJS, ZYDCODFFHKBSBX, YORHXMPAAGJMBQ, BDYXCFBCXQDFML, NNHILEDWCKCFCW, ZFPFNRPAHXIHFH, ZMFGALKRHNANBL, ZVURBGQIUCRYAI, PHIMFKPFFZBHON, OTBXEYGWBXCGEV, and VIIBDKIVWKXLPR.

In another aspect, the present disclosure is directed to a compound. In one set of embodiments, the compound is a compound selected from FIGS. 2-5. In another set of embodiments, the compound is a compound from the following compounds, each identified by a first hash block of an InChIKey representation of the compound: YIUNZXJUVIYWLY, IWZBDCZQSPYOAC, AYPXQZLNVLDXPA, OBMXDIQLECDWET, KGZQSIRNJDJSEH, VPLJSKRVTQIUAX, XHNXSWOIEDSWRG, KKHFSNLNDSPNEY, WWPTWXGTOMDZOP, CQAOWYYRAFZAIL, FYPLERMMZIJDTF, IPHYUBYRYRJDDC, DPRGUKRGUQONDT, PEQUWNGOLLDGLK, KHXYHMRDROEKSK, KMXMRHQTEDUUMD, XWDHGFWXYZPHOZ, NFFSPXXVGVOJMR, OPBVQNQRXUIJJS, ZYDCODFFHKBSBX, YORHXMPAAGJMBQ, BDYXCFBCXQDFML, NNHILEDWCKCFCW, ZFPFNRPAHXIHFH, ZMFGALKRHNANBL, ZVURBGQIUCRYAI, PHIMFKPFFZBHON, OTBXEYGWBXCGEV, and VIIBDKIVWKXLPR.

In another aspect, the present disclosure encompasses methods of making one or more of the embodiments described herein, for example, various electrochromic materials or optoelectronic compounds. In still another aspect, the present disclosure encompasses methods of using one or more of the embodiments described herein, for example, various electrochromic materials or optoelectronic compounds.

Other advantages and novel features of the present disclosure will become apparent from the following detailed description of various non-limiting embodiments of the disclosure when considered in conjunction with the accompanying figures.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

The present disclosure generally relates to optoelectronic compounds, including certain 1,2-diketones, for example, 2,3,5,6-tetrafluoro-4-[2-oxo-2-(4-oxo-3-chromenyl)acetyl]benzonitrile. In certain embodiments, these compounds can be used as electrochromic media in devices requiring change of optical absorbance or transmittance as a function of applied voltage. Examples of such devices include electrochromic mirrors, windows, displays, or the like. One specific example is solar and thermal control by smart, dynamic windows for energy-efficient buildings. Other embodiments of the disclosure are generally directed to systems and devices using such compounds, methods of using such compounds, e.g., to control the absorbance or transmittance of light, kits involving such compounds, or the like.

One aspect is generally directed to systems and methods of electrically controlling the absorbance or transmittance of light. For example, in some cases, certain types of 1,2-diketones are used that can function as optoelectronic compounds. Such optoelectronic compounds can be used in electrochromic media, where the amount of light absorbance or transmittance is controllable by applying voltages. For example, the optoelectronic compound may exhibit a first light transmittance at a first voltage (e.g., including 0 V), and a second light transmittance at a second voltage different from the first. In some cases, a variety of different voltages can be applied to control the light absorbance or transmittance of the electrochromic media.

Certain embodiments are generally directed to 1,2-diketones. 1,2-diketones have not generally been identified as being suitable optoelectronic compounds, e.g., for use within electrochromic media. However, it has been found that certain types of 1,2-diketones are able to absorb a variable amount of visible light (e.g., wavelengths of 400-700 nm) and/or near-infrared light (e.g., wavelengths of 700-2500 nm) in response to applied voltages.

One non-limiting example of a 1,2-diketone is 2,3,5,6-tetrafluoro-4-[2-oxo-2-(4-oxo-3-chromenyl)acetyl]benzonitrile, which has a formula $C_{18}H_5F_4NO_4$, and a structure:

Other examples of 1,2-diketones include compounds with the following structure:

X = O, Y = C=O
X = C=O, Y = O

In the above structure, the functional groups $R^1$, $R^2$, $R^3$, and $R^4$ may each independently be —H, or be selected from groups such as an alkyl group (methyl, ethyl, propyl, isopropyl, n-butyl, t-butyl, pentyl group, hexyl, octyl, dodecyl, etc.), a cycloalkyl group (such as a cyclopropyl, cyclopentyl, cyclohexyl, cyclooctyl, etc.), or functional groups such as nitro, nitrile, alkoxy, hydroxy, amide, amino, carboxyl, halogens such as F, Cl, Br, or I etc., or trihalo alkyl such as trifluoromethyl, trichloromethyl, tribromomethyl, an acyl group, etc.

Additionally, the substituent $R^5$ may also be selected from a group such as 4-H-3-chromenyl, 4-oxo-3-chromenyl, an unsubstituted aryl, a substituted aryl, a hetero-aryl such as a furyl, pyrrolyl, thiazolyl, oxazolyl, imidazolyl, pyridyl, or pyrazinyl etc., an aliphatic carbocyclic group, or a heterocyclic group, or the like.

Without wishing to be bound by any theory, it is believed that substitutions such as these will not significantly affect the electrochromic properties of the 1,2-diketones structure so as to prevent such structures from being electrochromic, and those of ordinary skill in the art will be able to readily substitute such structures in the synthesis of such 1,2-diketone structures.

Thus, non-limiting examples of 1,2-diketones include methyl 2,6-difluoro-4-{2[p-(6-methyl-4H-chromen-2-yl)phenyl]-2-oxoacetyl}benzoate or 2-(p-acetylphenyl)-1-(6-methyl-4-oxo-2-chromenyl)-1,2-ethanedione, or those represented by general structures such as in the following:

In the above structures, the functional groups $R^1$, $R^2$, $R^3$, $R^4$, $R^6$, $R^7$, $R^9$ and $R^{10}$ may each independently be —H, or be selected from groups such as an alkyl group (methyl, ethyl, propyl, isopropyl, n-butyl, t-butyl, pentyl group, hexyl, octyl, dodecyl, etc.), a cycloalkyl group (such as a cyclopropyl, cyclopentyl, cyclohexyl, cyclooctyl, etc.), or functional groups such as nitro, nitrile, alkoxy, hydroxy, amide, carboxylic acid, halogens such as F, Cl, Br, or I etc., an alkyl sulfonyl, a trihalo alkyl such as trifluoromethyl, trichloromethyl, tribromomethyl, etc., an acyl group, or the like.

$R^5$ may be selected from a group such as 4-H-3-chromenyl, 4-oxo-3-chromenyl, an unsubstituted aryl, a substituted aryl, a hetero-aryl such as a furyl, pyrrolyl, thiazolyl, oxazolyl, imidazolyl, pyridyl, or pyrazinyl, etc. an aliphatic carbocyclic group, a heterocyclic group, or the like.

In any of the above structures, an alkyl group, alkenyl group, an aryl group, a carbocyclic group or a heterocyclic group represented by $R^1$, $R^2$, $R^3$, $R^4$, $R^6$, $R^7$, $R^9$ and $R^{10}$, etc. may further have substituents including an alkoxy group (such as methoxy, ethoxy, propoxy, or the like), a heterocyclic group (furyl, pyrrolyl, thiazolyl, oxazolyl, imidazolyl, pyridyl, pyrazinyl, pyrimidinyl, piperidinyl, pyrazolyl, morpholino, etc.), an alkoxy carbonyl group (such as a methoxy carbonyl, ethoxy carbonyl, etc.) an alkyl sulfonyl group, an amino group, an alkyl amino group (such as methyl amino, ethyl amino, propyl amino, aryl amino, etc.), a nitro group, a nitrile group, an isonitrile group, a thiol group, an amide group, a carboxylic acid group, a hydroxy group, a halogen atom (including F, Cl, Br, or I), a trifluoromethyl group, a trichloromethyl group, a tribromomethyl group, or the like.

Still other non-limiting examples of potentially suitable optoelectronic compounds, including various nitrobenzoyls, nitrobenzoyloxazoles, etc., are shown in FIGS. 2-5. Each structure is identified by the first hash block (14 characters) of the InChIKey (International Chemical Identifier Key) of the compound's molecular structure (i.e., its connectivity information). Those of ordinary skill in the art will be familiar with the InChI system and its related InChIKey hashes.

Certain 1,2-diketones may be synthesized, in multiple steps, using strategies, e.g., as discussed herein.

In some cases, the 1,2-diketones may exhibit a decrease in overall light transmittance of at least 20% when a voltage is applied (and a corresponding increase in visible light absorption). In some cases, this decrease may be observed in the visible (between 400 and 700 nm), and/or in the near infrared (between 700 nm and about 2500 nm) region of the electromagnetic spectrum. Some certain light frequencies may exhibit even a greater decrease in light transmittance (or increase in light absorption), e.g., a change of at least 30%, at least 40%, at least 50%, at least 60%, at least 70%, etc. e.g., at a frequency of 750 nm, 800 nm, 850 nm, etc.

In some cases, the voltage applied to the 1,2-diketones to cause such changes in light absorbance or transmittance may be at least −2 V, at least −1.5 V, at least −1 V, at least −0.5 V, at least −0.3 V, etc. versus a ferrocene/ferrocenium couple.

In some embodiments, certain 1,2-diketones may exhibit a near-total transmittance of light in the range of 350 nm to 1100 nm (including visible and near infra-red light) when in neutral form. In other cases, the 1,2-diketone may absorb at least 20%, at least 25%, at least 30%, at least 35%, at least 40%, at least 45%, at least 50%, at least 55%, at least 60%, or at least 65% of light in the range of 650 nm and 1100 nm when a negative voltage is applied, e.g., voltages such as are described herein. In some cases, the 1,2-diketone compound is able to absorb incident light between 650 nm and 1100 nm.

Without wishing to be bound by any theory, it is believed that such 1,2-diketones exhibit electrochromic properties when an electron is added and ions, such as tetrabutylammonium, are transported to and/or from the 1,2-diketones, e.g., due to changes in voltage.

Figure 1:
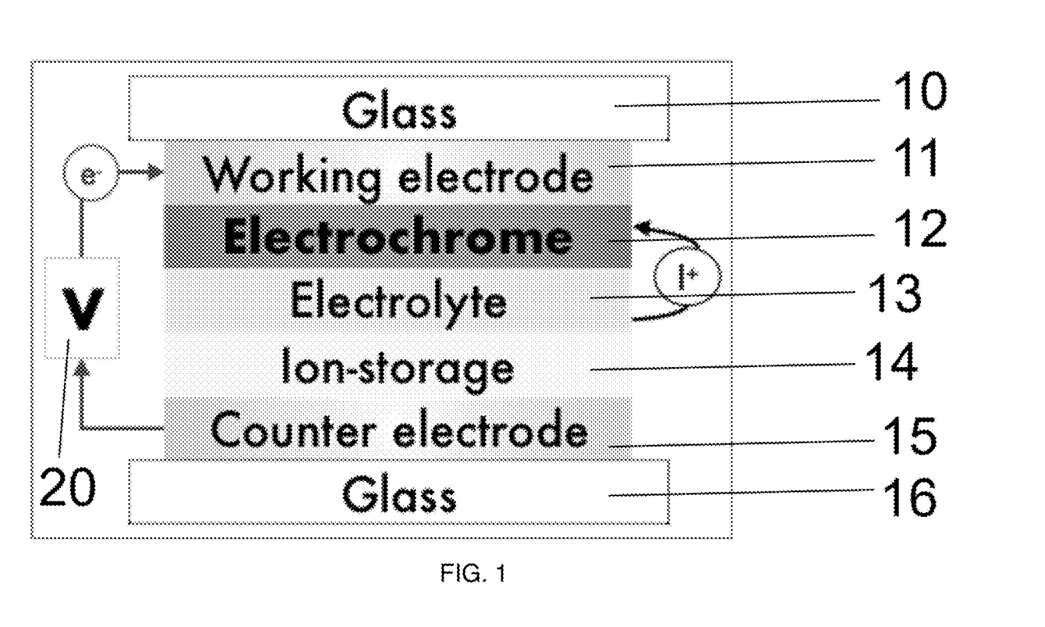
FIG. 1 illustrates an electrochromic device in accordance with one embodiment of the disclosure.
Figure 2:
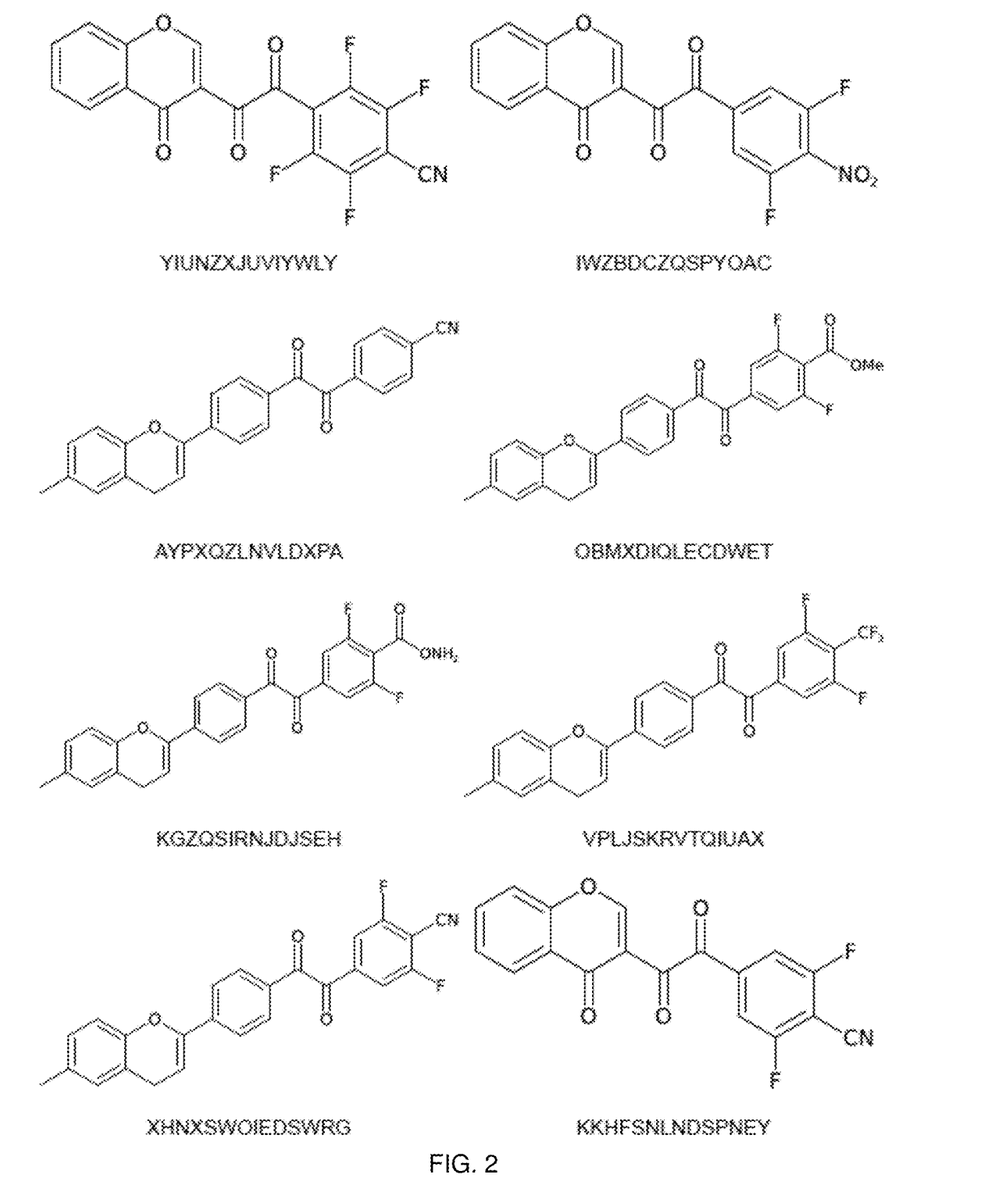
FIGS. 2-5 illustrate certain additional compounds, in accordance with other embodiments of the invention.
Figure 3:
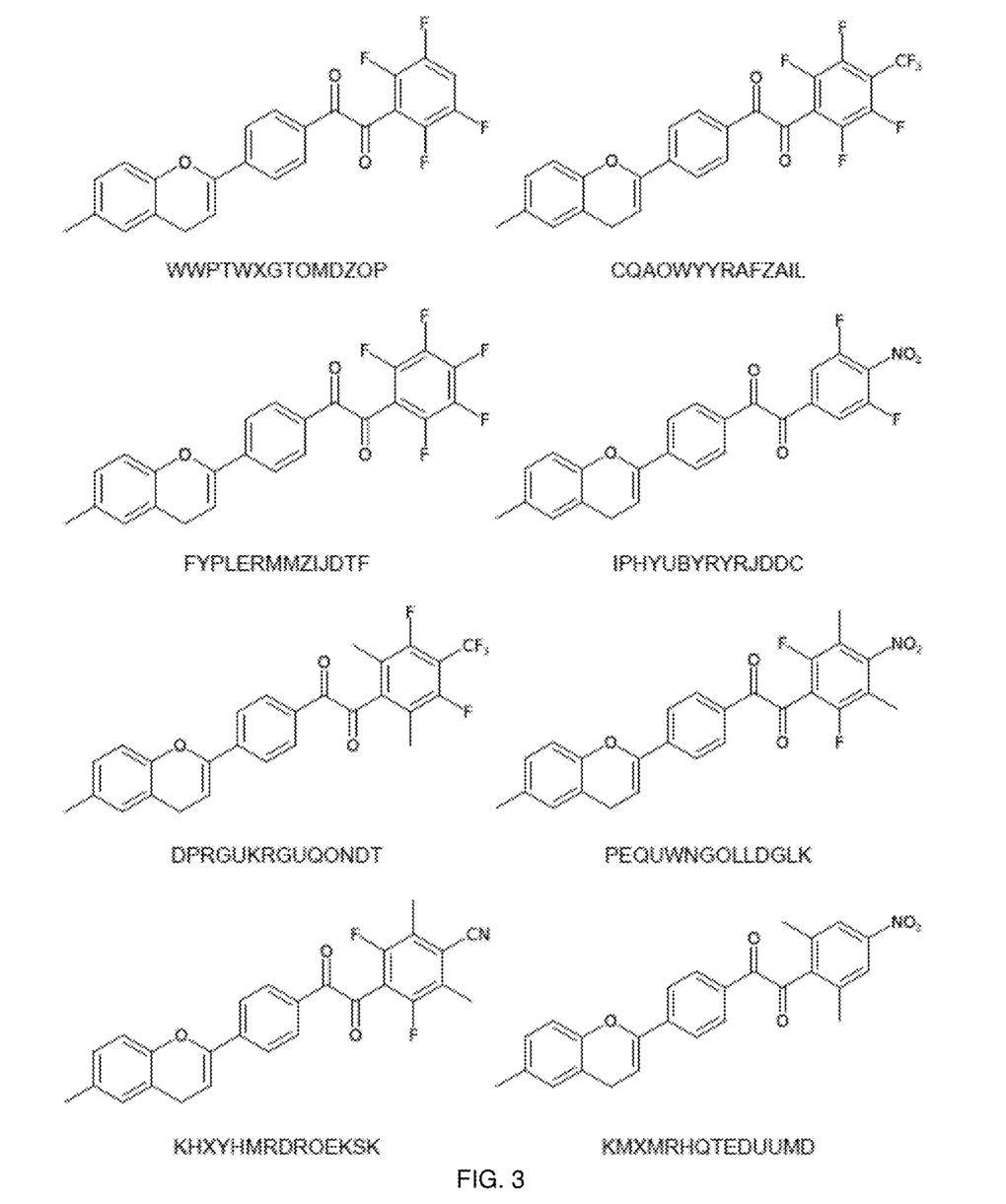
Figure 4:
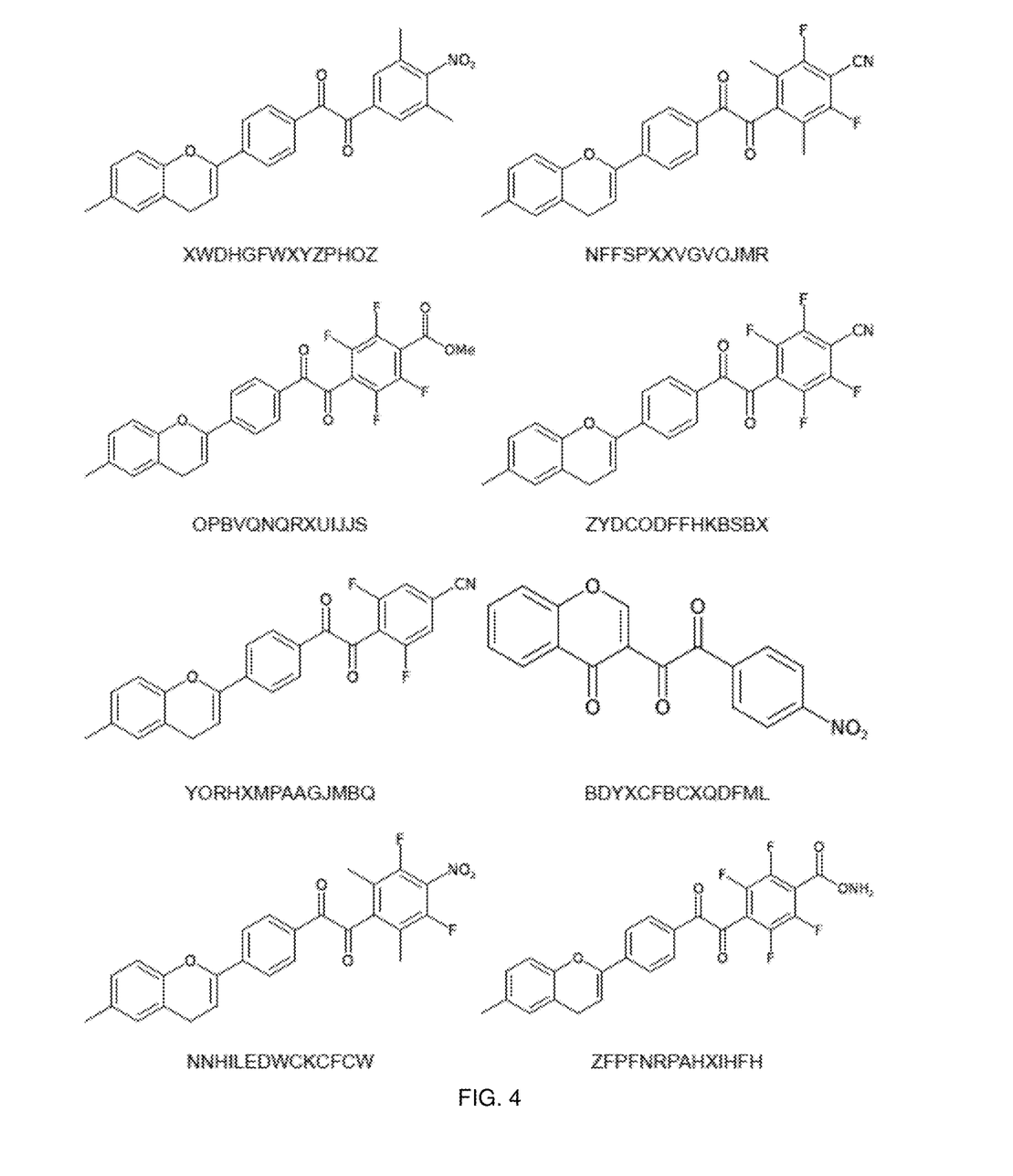
Figure 5:
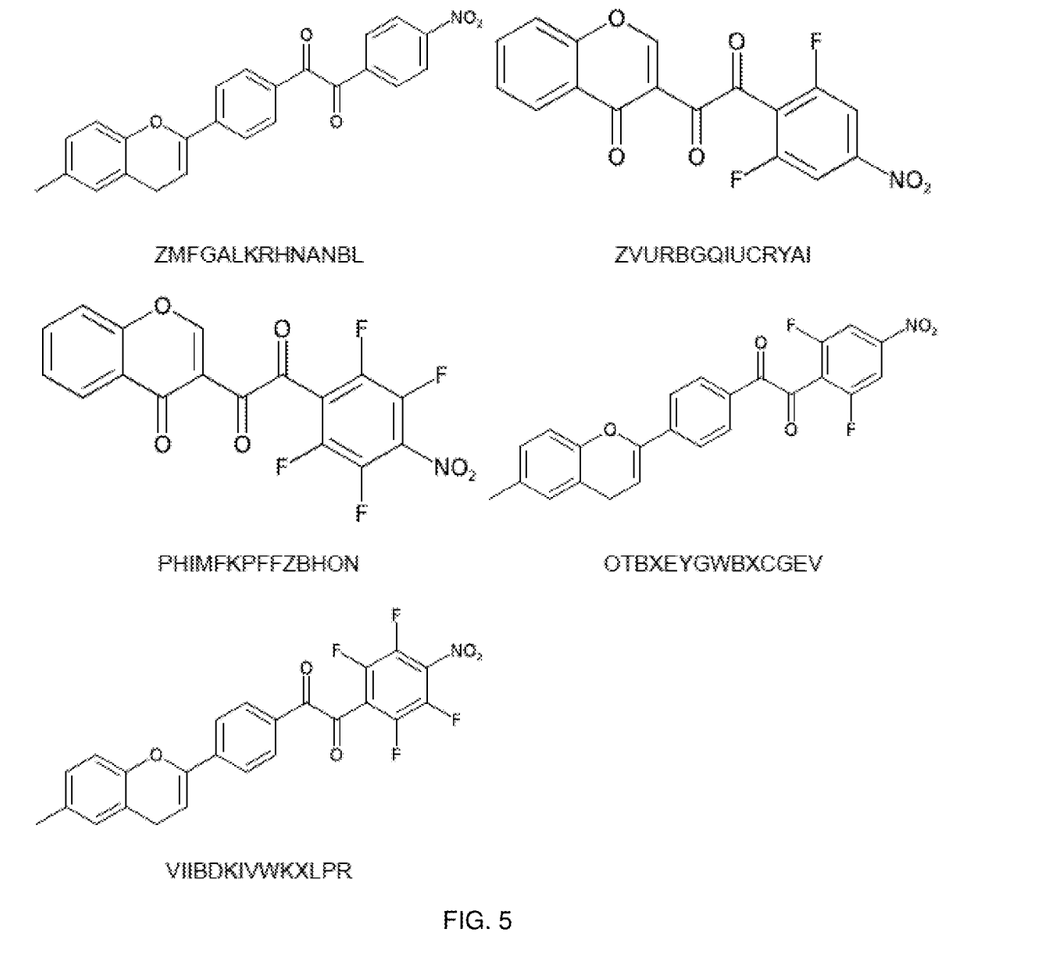

In some aspects, such 1,2-diketones may be contained within an electrochromic device. Examples of such devices include, but are not limited to, electrochromic mirrors, solar control windows, display devices, as well as molecular systems for digital information processors, optical recording, thermal writing displays, laser printers, infrared photography, or the like. An example of an electrochromic device is shown in FIG. 1. However, it should be understood that this is by way of example only. In other embodiments, the electrochromic device may have different structures or electrical configurations, etc. The electrochromic device also need not be transparent or designed to allow light to pass through; an example of such a device is an electrochromic mirror.

In one set of embodiments, an electrochromic device may comprise a working electrode and a counter electrode, over which a voltage can be applied. The voltage may be used to cause the flow of electrons from the counter electrode to the working electrode, or in the opposite direction (e.g., if a negative voltage is applied). As a non-limiting example, FIG. 1 shows an electrochromic device comprising a working electrode 11 and a counter electrode 15, over which a voltage V (20) can be applied, to cause electrons (e−) to flow from the working electrode through the electrochromic layer to the counter electrode.

One or both of these electrodes may be substantially transparent in certain cases, e.g., to allow a substantial amount of light to pass through the electrode, at least in the visible range. For instance, an electrode may allow at least 50%, at least 70%, or at least 90% of the incident visible light to pass through. For instance, an electrode may be made from a substantially transparent material, such as indium tin oxide (ITO), ZnO:F, ZnO:Al, ZnO:Ga, ZnO:B, ZnO:In, $In_2O_3$:Sn, $Cd_2SnO_4$, $SnO_2$:Sb, conjugated polymers (such as PEDOT:PSS), silver nanowires, graphene, or other materials. However, in some embodiments, one or both of the electrodes may be made out of materials that are not substantially transparent, for example, metals such as platinum, gold, silver, or copper, or conductive non-metals such as carbon. In some cases, materials that are not substantially transparent may nonetheless be used, e.g., in embodiments where the electrode is substantially transparent, or where light is allowed to pass through the device; for example, the electrode may be formed as a mesh or other structure containing openings that allows at least some light to pass through. In addition, it should be understood that an electrode need not be substantially transparent in all embodiments, and that the electrodes within a device may have the same or different amounts of light transparency.

In some embodiments, the electrochromic layer is not stable. For example, the electrochromic device may also contain an additive stabilizing it against photostability or weatherability. Additives may include, but are not limited to, light stabilizers, including UV absorbers, quenchers, radical scavengers, peroxide decomposers such as (2-hydroxyphenyl)benzotriazoles, hydroxyphenyl-s-triazines, 2-hydroxybenzophenones, oxalicanilides, hydroxyphenylpyrimidines, salicylic acid derivatives, cyanoacrylates, or other materials with high extinction coefficients, broad absorption bands (e.g., between 290-380 nm), steep absorption curves in the near-UV light range, photochemical stability, good solubility in typical solvents used in electrochromic devices, low volatility, etc. Many such additives are commercially available.

In some embodiments, stabilization of other device components, e.g., within the electrochromic layer, may be used for improvements of the electrode/electrolyte interface, electrochemical stability window, and/or flammability. These may include, but are not limited to, electrolyte additives, electrode passivation additives, such as substituted catechol carbonate, ethylene sulfite, propylene sulfite, fluoroethylene carbonate, vinylene carbonate, N,N'-diethylaminotrimethylsilane, N,N'-diethylamino trimethylsilane, heptamethyldisilazane, ethylene dioxythiophene, prop-1-ene-1,3-sulfone, and the like. Other additives that may be used include, but are not limited to, overcharge protection additives, such as biphenyl, cyclohexylbenzene, xylene, 2,5-ditertbutyl-1,4-dimethoxybenzene, and the like.

In other embodiments, the device may include flame retardant additives, such as halide and phosphorus compounds, including but not limited to, alkyl phosphates, aryl phosphates, mixed alkyl aryl phosphates, alkyl phosphites, alkyl phosphonates, phosphonamidate, phosphazenes, tris(2, 2,2-trifluoroethyl) phosphite, tris(2,2,2-trifluoroethyl) phosphate, tris(pentafluorophenyl) phosphine, and bis(2,2,2-trifluoroethyl) methylphosphonate, and the like. For example, one or more additives may be contained within the electrochromic layer.

In some cases, the electrochromic material is present in a separate region that is in direct contact with the working electrode. However, other configurations are possible. For example, there may be one or more other regions (e.g., layers) intervening between the layer containing the electrochromic material and the working electrode, or the electrochromic material may be present as part of the working electrode, instead of being present in a separate region. As an example, in FIG. 1, electrochromic region 12 is shown adjacent to, or as a thin layer deposited on the working electrode. In other cases, the electrochromic material may be in direct contact with the working electrode. In some embodiments, the electrochromic material may be embedded within the working electrode.

In some cases, the electrochromic region may be relatively thin, for example, as a layer or a coating on an electrode. For instance, in some cases, the region may have a cross-sectional thickness of less than 1 mm, less than 500 micrometers, less than 300 micrometers, less than 100 micrometers, less than 50 micrometers, less than 30 micrometer, less than 10 micrometers, less than 5 micrometers, less than 3 micrometers, less than 1 micrometer, less than 500 nm, less than 300 nm, less than 100 nm, less than 50 nm, less than 30 nm, less than 10 nm, or less than 5 nm. Without wishing to be bound by any theory, it is believed that thinner regions may allow for more penetration of ions, e.g., from an electrolyte. However, the electrochromic region may also have sufficient thickness so as to cause a substantial change in light absorbance or transmittance, e.g., when a voltage is applied.

Accordingly, in some cases, the device may contain an electrolyte that can contain ions, such as positive ions, that are able to flow towards the working electrode such that the ions are able to interact or react with the electrochromic materials under the influence of the applied voltage.

For instance, in FIG. 1, electrolyte 13 is shown to be adjacent to electrochromic region 12 containing the electrochromic materials, and when a voltage is applied, positive ions ($I^+$) are able to flow from the electrolyte to the electrochromic region. However, as noted above, in other cases, the electrochromic region may not be present as a separate region, and the electrochromic materials may be located in a different region within the electrochromic device, e.g., within the working electrode. Examples of positive ions include, but are not limited to, tetraalkylammonium, alkali metal cations (such as $Li^+$, $Na^+$, $K^+$, $Rb^+$, $Cs^+$, $Fr^+$, $H^+$) from inorganic acids (such as sulfuric acid, nitric acid, hydrochloric acid, etc.) or specialty membranes like Nafion or LiPON cations such as those discussed below.

The electrolyte, in some cases, may contain an organic salt and/or a solvent. The electrolyte may include, for example, ionic liquids, polymer electrolytes, solid-state electrolytes, gel electrolytes, aqueous and nonaqueous electrolytes, or the like. Non-limiting examples of organic salts include tetraalkylammonium salts, such as tetrabutylammonium hexafluorophosphate, tetrabutylammonium acetate, tetrabutylammonium benzoate, tetrabutylammonium bistrifluoromethanesulfonimidate, tetrabutylammonium iodide, tetrabutylammonium perchlorate, tetrabutylammonium tetrafluoroborate, tetrabutylammonium tetraphenylborate, tetraethylammonium hexafluorophosphate, tetraethylammonium acetate, tetraethylammonium benzoate, tetraethylammonium bistrifluoromethanesulfonimidate, tetraethylammonium iodide, tetraethylammonium perchlorate, tetraethylammonium tetrafluoroborate, tetraethylammonium tetraphenylborate, or the like. The organic salt may be used to supply ions, e.g., as discussed above. Non-limiting examples of solvents include, acetonitrile (MeCN), N,N-dimethylformamide (DMF), N,N-dimethylacetamide (DMA), tetrahydrofuran (THF), dimethylsulfoxide (DMSO), 1,2-dimethoxyethane (DME), dichloromethane (DCM), or propylene carbonate (PC), as well as other amphiprotic (neutral, protogenic, and protophilic) and aprotic (dipolar protophilic, dipolar protophobic, and inert) solvents, or the like.

In some cases, some ions that can interact with the electrochromic material may be stored within an ion-storage region. In some cases, the ion-storage region may be made out of other transparent conductors that are capable of storing charge, such as nickel oxide, vanadium oxide, etc. In certain embodiments, the positive ions from the electrolyte may interact with the electrochromic material and/or the negative ions may go into the ion-storage layer. A non-limiting example of such a region is shown in FIG. 1 as ion-storage region 14. However, it should be understood that such a region is optional, and in certain embodiments, no ion-storage region may be present, e.g., when the counter electrode itself can accommodate the ions.

In addition, in certain embodiments, the electrochromic device may also be contained within a suitable protective media. For example, as is shown in FIG. 1, glass regions 10 and 16 may be used to protect the device. The protective media may be, for example, glass, plastics, polymers, or the like, and in certain embodiments, the protective media may be non-conductive. Examples of other protective media include, but are not limited to, polycarbonate, acrylic, polyvinyl chloride (PVC), polyethylene terephthalate glycol-modified (PETG), cyclic olefin copolymer, liquid silicon rubber, polyethylene, ionomer resin, transparent polypropylene, fluorinated ethylene propylene, styrene methyl methacrylate, styrene acrylonitrile resin, etc.

U.S. Provisional Patent Application Ser. No. 63/177,798, filed Apr. 21, 2021, entitled "Systems and Methods for Electrochromic Molecules," is incorporated herein by reference.

The following examples are intended to illustrate certain embodiments of the present disclosure, but do not exemplify the full scope of the disclosure.

Example 1

In general diketones can be prepared in a two-step process. Sonogashira coupling between an acetylenic compound and an aryl or vinyl halide in presence of palladium catalyst in a suitable solvent, followed by oxidation of the resulting coupled compound under mild oxidation conditions. The availability of a vast number of terminal acetylinic compounds and halides makes the synthesis of a variety of diketones highly feasible.

Example reactions for certain compounds stated above follows the route as shown below.

Reaction Conditions:
  Step 1: Sonogashira coupling; PdCl$_2$, Et$_3$N, Cyrene, room temperature
  Step 2: Oxidation; KMnO$_4$, NaHCO$_3$, MgSO$_4$, Acetone, water, room temperature While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain, using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the disclosure includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochromic device, comprising:
an electrochromic region comprising a 1,2-diketone; and
a voltage source able to apply voltage to the electrochromic region,
wherein the 1,2-diketone comprises a structure:

2. An electrochromic device, comprising:
an electrochromic region comprising a 1,2-diketone; and
a voltage source able to apply voltage to the electrochromic region,
wherein the 1,2-diketone comprises methyl 2,6-difluoro-4-{2-[p-(6-methyl-4H-chromen-2-yl)phenyl]-2-oxoacetyl}benzoate.

3. An electrochromic device, comprising:
an electrochromic region comprising a 1,2-diketone; and
a voltage source able to apply voltage to the electrochromic region,
wherein the 1,2-diketone comprises 2-(p-acetylphenyl)-1-(6-methyl-4-oxo-2-chromenyl)-1,2-ethanedione.

4. An electrochromic device, comprising:
an electrochromic region comprising a 1,2-diketone; and
a voltage source able to apply voltage to the electrochromic region,
wherein the 1,2-diketone is selected from the group consisting of the following compounds, each identified by a first hash block of an InChIKey representation of the compound: YIUNZXJUVIYWLY, AYPXQZLNVLDXPA, OBMXDIQLECDWET, KGZQSIRNJDJSEH, VPLJSKRVTQIUAX, XHNXSWOIEDSWRG, KKHFSNLNDSPNEY, WWPTWXGTOMDZOP, CQAOWYYRAFZAIL, FYPLERMMZIJDTF, IPHYUBYRYRJDDC, DPRGUKRGUQONDT, PEQUWNGOLLDGLK, KHXYHMRDROEKSK, KMXMRHQTEDUUMD, XWDHGFWXYZPHOZ, NFFSPXXVGVOJMR, OPBVQNQRXUIJJS, ZYDCODFFHKBSBX, YORHXMPAAGJMBQ, BDYXCFBCXQDFML, NNHILEDWCKCFCW, ZFPFNRPAHXIHFH, ZMFGALKRHNANBL, ZVURBGQIUCRYAI, PHIMFKPFFZBHON, OTBXEYGWBXCGEV, and VIIBDKIVWKXLPR.

5. The electrochromic device of claim 4, wherein the electrochromic region exhibits a change in light transmittance when a voltage is applied to the electrochromic region by the voltage source.

6. The electrochromic device of claim 4, further comprising a working electrode and a counter electrode for applying the voltage to the substrate.

7. The electrochromic device of claim 6, wherein the working electrode comprises the electrochromic region.

8. The electrochromic device of claim 6, further comprising an electrolyte positioned between the working electrode and the counter electrode, wherein the electrolyte comprises ions able to react with the 1,2-diketone to exhibit a change in light transmittance.

9. A compound selected from the group consisting of the following compounds, each identified by a first hash block of an InChIKey representation of the compound: YIUNZXJUVIYWLY, AYPXQZLNVLDXPA, OBMXDIQLECDWET, KGZQSIRNJDJSEH, VPLJSKRVTQIUAX, XHNXSWOIEDSWRG, KKHFSNLNDSPNEY, WWPTWXGTOMDZOP, CQAOWYYRAFZAIL, FYPLERMMZIJDTF, IPHYUBYRYRJDDC, DPRGUKRGUQONDT, PEQUWNGOLLDGLK, KHXYHMRDROEKSK, KMXMRHQTEDUUMD, XWDHGFWXYZPHOZ, NFFSPXXVGVOJMR, OPBVQNQRXUIJJS, ZYDCODFFHKBSBX, YORHXMPAAGJMBQ, BDYXCFBCXQDFML, NNHILEDWCKCFCW, ZFPFNRPAHXIHFH, ZMFGALKRHNANBL, ZVURBGQIUCRYAI, PHIMFKPFFZBHON, OTBXEYGWBXCGEV, and VIIBDKIVWKXLPR.

* * * * *